(12) United States Patent
Martin

(10) Patent No.: US 6,247,017 B1
(45) Date of Patent: Jun. 12, 2001

(54) SERVER-CLIENT COMMUNICATION OVER A NETWORK

(75) Inventor: Jean-Christophe Martin, Varces (FR)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/045,498

(22) Filed: Mar. 20, 1998

(51) Int. Cl.⁷ .................................................. G06F 17/30
(52) U.S. Cl. ................................. 707/102; 709/226
(58) Field of Search .................................. 707/102, 104, 707/8, 201; 395/200; 709/226

(56) References Cited

U.S. PATENT DOCUMENTS

| | | | |
|---|---|---|---|
| 5,473,680 | * | 12/1995 | Porter ............................ 379/201 |
| 5,677,945 | * | 10/1997 | Mullins et al. .............. 379/91.02 |
| 5,696,902 | * | 12/1997 | Leclerq et al. ................... 705/400 |
| 5,758,344 | * | 5/1998 | Prasad et al. ..................... 707/10 |
| 5,784,443 | * | 7/1998 | Chapman et al. ................ 379/119 |
| 5,812,533 | * | 9/1998 | Cox et al. ......................... 370/259 |
| 5,812,793 | * | 9/1998 | Shakib ............................. 395/200 |
| 5,892,946 | * | 4/1999 | Woster et al. ................... 709/316 |
| 5,956,489 | * | 9/1999 | San Andres et al. ............ 395/200 |
| 6,154,776 | * | 11/2000 | Nartun ............................. 709/226 |

OTHER PUBLICATIONS

"Lightweight Directory Access Protocol", Yeong et al., (RFC 1777) pp. 1–22(17 Pages) Mar. 1995.

* cited by examiner

*Primary Examiner*—Wayne Amsbury
(74) *Attorney, Agent, or Firm*—William J. Kubida; Kent A. Lembke; Hogan & Hartson LLP (57) ABSTRACT

A network element maintains a local representation of a variable from a network directory service without needing to poll the variable in the directory service. The network element is arranged to accept replication messages from the directory service for updating the local record. By using a replication mechanism, it is possible to maintain the current value of a variable without repeated polling of the variable in the directory service.

16 Claims, 7 Drawing Sheets

← SEARCH
← ADD
← MODIFY
← MODIFY RDN
← DELETE

← = TRANSMIT

FIG. 9A
PRIOR ART

← SEARCH
← ADD
← MODIFY
← MODIFY RDN
← DELETE
→ ADD
→ MODIFY
→ MODIFY RDN
→ DELETE

→ = RECEIVE
← = TRANSMIT

FIG. 9B

SERVER-CLIENT COMMUNICATION OVER A NETWORK

BACKGROUND OF THE INVENTION

This invention relates to communication between a server and a client over a telecommunications network, for example over the Internet. In particular, the invention finds application to communication over a telecommunications network employing directory services.

A directory service as provided in a telecommunications network, such as the Internet provides, is a physically distributed repository of data for managing the network. The purpose of the directory service is to locate and identify users and resources in the network. In the same manner as a telephone directory, the information can be classified by user or classification. Information about network components is stored in a distributed manner. The information is replicated in a number of network servers so that a user or service can refer to a local server for the information. Modifications made to the directory information are propagated to the replicated versions. In view of the need for replication, the directory service clearly works best if the information held is relatively static.

Figure 1:
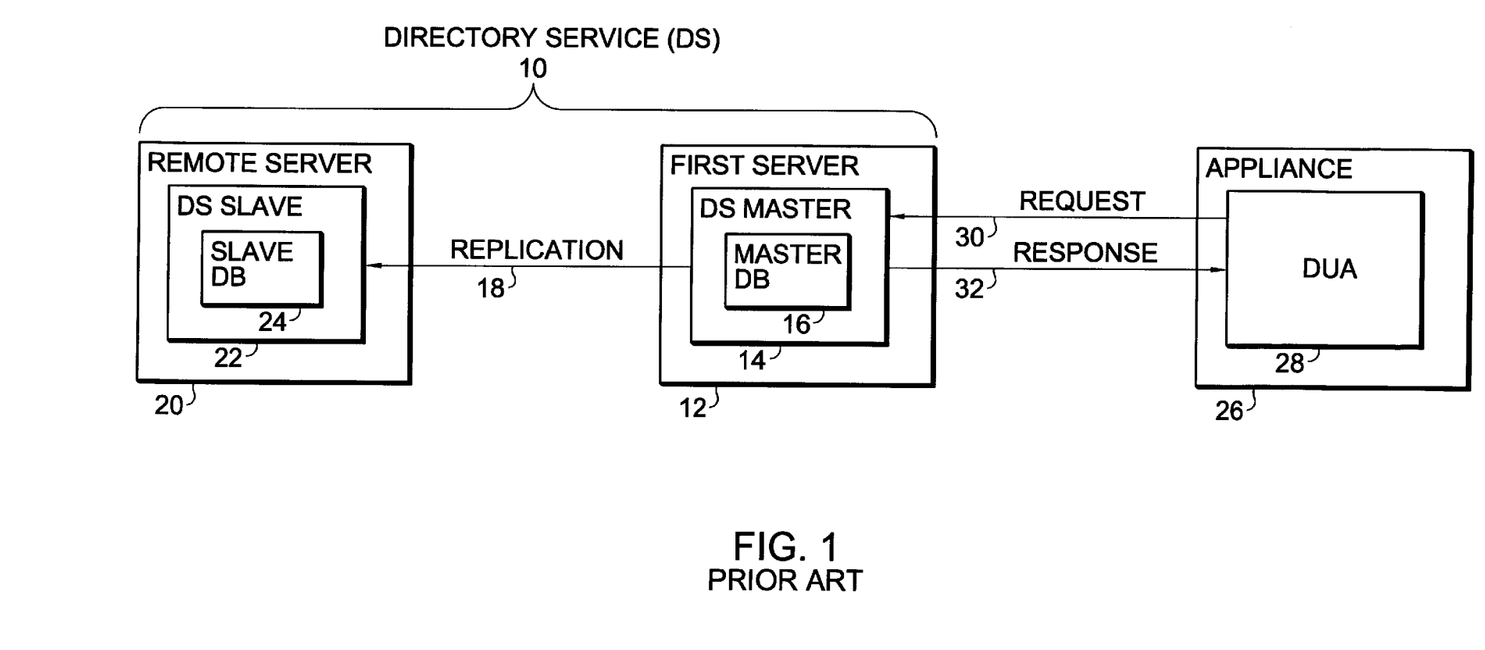
FIG. 1 is a schematic representation of conventional prior art message exchange between a client and a server for a directory service having master and slave directory servers.

FIG. 1 of the accompanying drawings is a simple representation of a typical prior art Internet environment supporting a directory service 10. In this environment, a directory service master 14 including a master directory database 16 is located on a first server 12. Replication 18 is employed to create a replicated version of the directory service master database 16 on each of one or more remote server(s) 20 in one or more directory service slave database(s) 24 of one or more directory service slave(s) 22. The replication mechanism, in order, for example, to replicate a modification of the directory service master database 16 on the directory service slave database(s) 24, uses unsolicited messages between the directory service master 14 and each directory service slave 22. The combination of the directory service master 14 and the directory service slave(s) 22 forms the directory service 10. Only one remote server 20 with one directory service slave 22 and one directory service slave database 24 is shown in FIG. 1 for illustrative purposes and ease of explanation. The replication 18 can be effected under a conventional directory service protocol, for example the Lightweight Directory Access Protocol (LDAP). Information about LDAP can be found, for example, in W Yeong, T Howes, and S. Kille, "Lightweight Directory Access Protocol", RFC 1777, March 1995.

A Directory User Agent (DUA) 28 for a device or application (hereinafter termed an appliance) 26 is able to access the directory service 10 to read information from or to write information to the directory service 10. The DUA 28 forms a directory user client for access to the directory service server(s) 12/20. As shown in FIG. 1, the access is by way of the directory service master 14, although it could equally be by way of a directory service slave 22. It will be appreciated that there will typically be a large number of appliances and DUAs 28 requiring and making access to the directory service 10. Only one appliance 26 and DUA 28 is shown in FIG. 1 for illustrative purposes and ease of explanation only.

Access by the DUA 28 to the directory service 10 is by way of request 30 and response 32 messages under a conventional protocol, for example LDAP. This protocol enables clients to perform protocol operations with respect to servers. A client transmits a protocol request describing the operation to be performed to a server. The server then performs the required operations on the directory and returns one or more responses containing any results or errors to the requesting client.

An aim of the protocol is to minimise the complexity of clients. LDAP is designed to operate over a connection-oriented, reliable transport, with all 8 bits in an octet being significant in the data stream. For example, LDAP can operate over the Transmission Control Protocol (TCP) on the Internet (IP), with LDAP messages mapped directly onto the TCP bytestream.

It is well known that Internet usage is expanding at a phenomenal rate. As well as an ever increasing number of users making access, the type of information transfer which is occurring is changing. While the conventional structure described with reference to FIG. 1 is quite efficient for information which is essentially static, it becomes network intensive when, for example, a DUA 28 needs to poll a variable, for example directory information about a particular user or network resource.

The invention seeks to provide a mechanism, method and system which seeks to eliminate or at least mitigate the problems associated with the conventional directory access mechanisms described above.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with a first aspect of the invention, there is provided a computer implemented method of updating a local record, or representation, of a variable in a network element forming a client of a directory service on a telecommunications network, the variable being maintained in a directory of the directory service. The method includes steps of, at the network element:

receiving a replication message from the directory service in respect of a change to the variable; and responding to the replication message to update the local record of the variable.

By using a replication mechanism, an embodiment of the invention enables a network element automatically to be updated via a telecommunications network in response to changes to a variable in a directory service without repeatedly needing to poll the variable in the directory of the directory service.

In a preferred embodiment of the invention the network directory is an objectbased directory, for example an Internet directory service X.500 directory. The replication messages can be LDAP replication messages.

The directory service can be arranged to associate with the variable a replication request in respect of the network element and to respond to changes to the variable to issue a replication message to the network element.

The replication request can be established by means of a filter for the variable which identifies at least the network element concerned. The directory service is thereby able to respond to changes to a variable to determine whether "polling" is required for the variable and to issue a replication message as the report message to the network element. The replication message can be an LDAP replication message.

The filter can be established manually by an operator of the directory service or could be established automatically in response to a request from the network element.

The local storage can be a cache for variables in the network element. The network element can be responsive to a request for a variable initially to access the cache, and in the absence of the variable in the cache, remotely to access the directory service for the variable.

The network element can, for example, be an appliance comprising a network service agent or other form of network device, or an application operable on a network device.

In accordance with another aspect of the invention, there is provided a network element comprising local storage for variables, a response mechanism configured to be operable to receive a replication message from a directory service in respect of a change to the variable at the directory service and to respond to the replication message to update the local record of the variable.

The request mechanism can be configured to be operable to transmit messages to a directory service of a network, the transmitted messages specifying operations on a variable of a directory in the directory service.

The invention also provides a directory service client comprising local storage for variables and a response mechanism configured to be operable to receive a replication message from a directory service in respect of a change to the variable at the directory service and to respond to the replication message to update the local record of the variable.

The invention also provides a computer program product on a data carrier medium for a network element of a computer network. The computer program product includes a response mechanism configured to be operable to receive a replication message from a directory service of the computer network in respect of a change to a variable at the directory service and an update mechanism configured to be responsive to the replication message to update a local record of the variable at the network element.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF THE PREFERRED EMBODIMENTS

Particular embodiments of the invention will now be described which are based on the LDAP protocol in the context of an Internet application. However, it will be appreciated that the invention is not limited thereto, and that the invention finds application to any communications network application where directory services are employed for polling variables.

Figure 2:
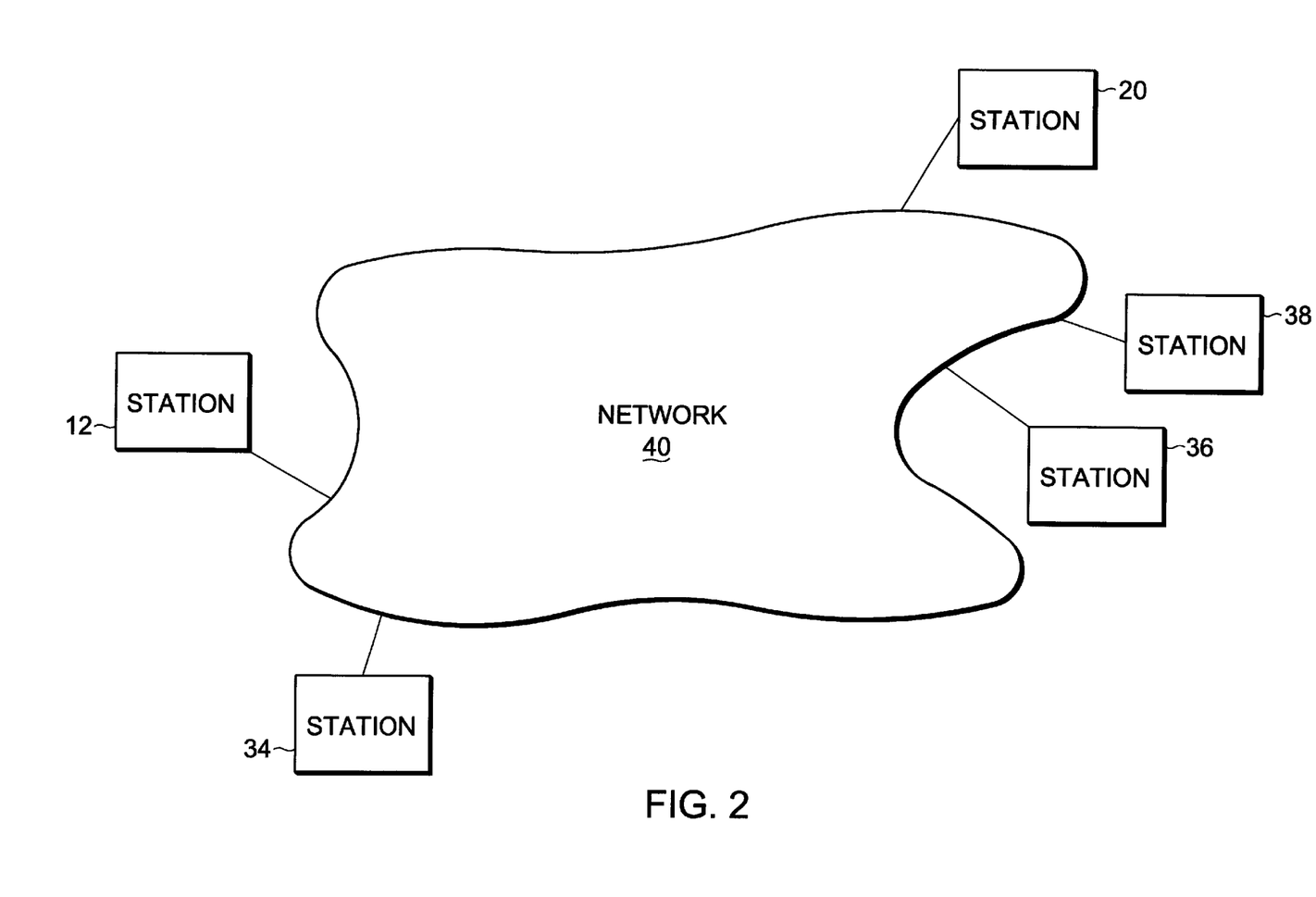
FIG. 2 is a schematic representation of a telecommunications network.

FIG. 2 of the accompanying drawings is a schematic representation of an instance of a computer network where five stations 12, 20, 34, 36 and 38 communicate via a network 40. The network could be a local area network (LAN) or wide area network (WAN), and intra- or Internetwork. Each of the stations could be formed by a single computer or by a network of computers, for example a LAN or WAN. Also, although only five stations are shown, it will be appreciated that a typical computer network includes many more stations arranged in a complex interconnection structure. The interconnection structure could be at one logical level, or could employ at least in part a hierarchical structure. The individual stations can make variable demands on the system, both relative to each other and over time.

In a typical situation, a relatively smaller number of the stations will form server stations and a relatively larger number of the stations will form client stations. In FIG. 2, stations 12 and 20 are assumed to support a directory service master 14 and a directory service slave 22, respectively, and that stations 34, 36 and 38 support appliances 26 including a DUA 28.

Particular embodiments of the invention described hereinafter relate to an embodiment of the invention implemented in an Internet environment, although, as mentioned above, it should be understood that the invention is not limited thereto.

In view of the popularity of the Lightweight Directory Access Protocol (LDAP) mentioned above to access X.500-based directory services, appliances are likely to retrieve more and more information through this protocol in the future than is the case at the present.

Although LDAP is quite efficient for an environment where directory information is relatively static, it becomes very network intensive when the information is more dynamic and when an appliance repeatedly needs to poll a variable, for example information about a user or service.

In an embodiment of the invention as described below, use is made of a partial replication mechanism to implement a push model between a directory service 10 and a DUA 28. In this embodiment of the invention, directory access protocol messages (LDAP messages) are used to achieve the partial replication at the DUA client 28. In other words, and in contradistinction to prior directory access systems, as well as reading and writing to the directory service, the DUA 28 also receives unsolicited messages from the directory services. Conventionally, although unsolicited messages pass between servers in existing directory systems, the invention proposes for the first time to provide local replication at a client such as a DUA 28, preferably by unsolicited LDAP messages issued by the directory service 10. Thus, the DUA 28 is not only a user agent, but also implements part of the directory service slave functionality.

A technical advantage of this push model is that the appliance does not unduly load or overload the network when polling for the modification of a variable. Any update on the variable or variables concerned is automatically sent to the appliance upon modification.

Figure 3:
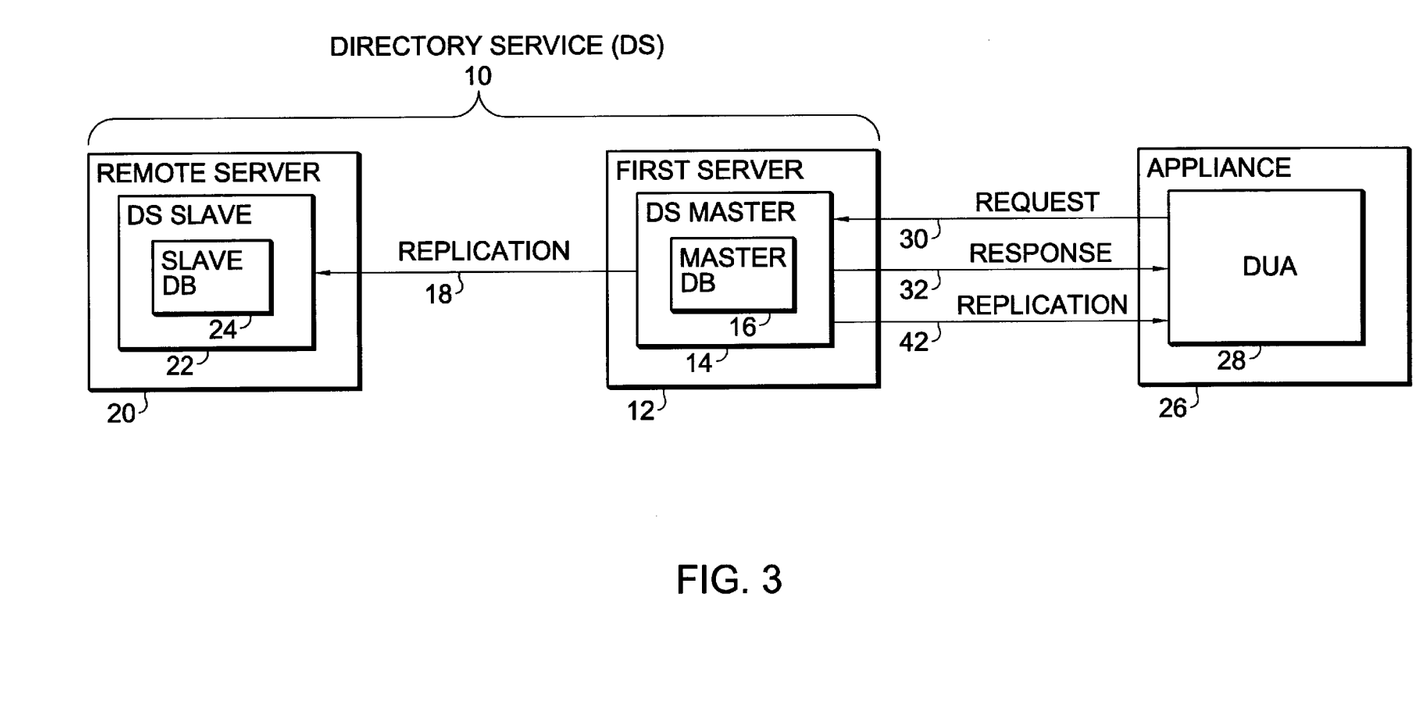
FIG. 3 is a schematic representation of message exchange between a client and a server for an embodiment of a directory service in accordance with the invention having master and slave directory servers.

FIG. 3 is a schematic block representation of an embodiment of the invention, which corresponds substantially to FIG. 1, apart from the provision of replication services to a client station (i.e. the DUA 28 at the appliance 26).

Thus, in FIG. 3, the directory service master 14 includes a master database 16 located on a first server 12. Replication 18 is employed to create a replicated version of the directory service master database 16 on each of one or more remote server(s) 20 in one or more directory service slave database (s) 24 of one or more directory service slave(s) 22. The replication mechanism uses unsolicited messages between the directory service master 14 and each directory service slave 22. The combination of the directory service master 14 and the directory services slave(s) 22 forms the directory service 10. Only one remote server 20 with one directory service slave 22 and one directory service slave database 24 is shown in FIG. 3 for illustrative purposes and ease of explanation. In this preferred embodiment of the invention, replication 18 is effected under LDAP.

A Directory User Agent (DUA) 28 for an appliance 26 forms a directory user client for accessing the directory service 10 to read information from or to write information to the directory service 10. Although the access is by way of the directory service master 14 in FIG. 1, it could equally by way of a directory service slave 22. It will be appreciated that there will typically be a large number of appliances and DUAs 28 requiring and making access to the directory service 10, only one appliance 26 and DUA 28 being shown in FIG. 3 for illustrative purposes and ease of explanation only.

Access by the DUA 28 to the directory service 10 is by way of request 30 and response 32 messages under a conventional protocol, for example LDAP. Thus, the client 28 will solicit one or more response messages 32 by issuing a request 30 to the server 14. The request message 30 may be a request for information about a network user or a network resource (for example an Internet protocol (IP) address for the user or resource). The server 14 will then return one or more solicited response messages 32 to the request 30. The soliciting request and solicited response messages will be linked to each other by the use of related message identifiers in the messages, typically in headers for the messages.

In addition to the solicited request messages 30 from the client 28 to the server 14, and the corresponding solicited response messages 32 from the server 14 to the client 28, in an embodiment of the invention, unsolicited replication messages 42 are sent from the server 14 to the client 28. These replication messages 42 permit local replication of at least a part of the directory service master database 16. This can be achieved either directly as shown in FIG. 3, where the DUA 28 communicates directly with the directory service master 14, or indirectly where the DUA 28 communicates with a directory service slave 20, for example by replication of at least part of the directory service slave database 24.

Figure 4:
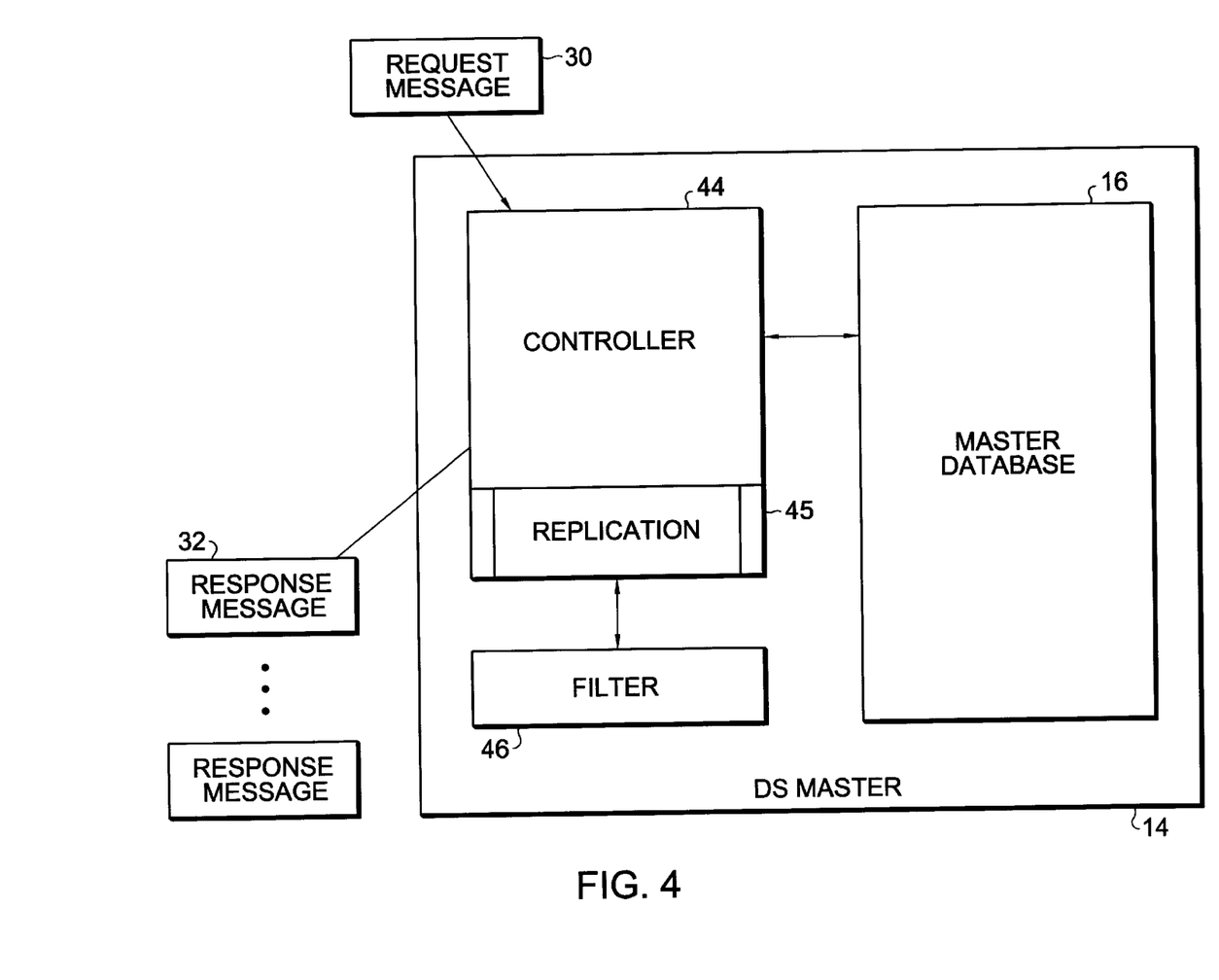
FIG. 4 is a schematic representation of aspects of a directory service master.

FIG. 4 is a schematic representation of aspects of a directory service master 14 relevant to an understanding of the invention. The directory service master includes a network directory in the form of a directory service master database 16, and a directory controller 44. The network directory is preferably an object-based directory, for example, an Internet directory service X.500 directory. Variables can be stored as objects within an object hierarchy in the database 16. The directory controller 44 is responsive to a request message 30 from a DUA 28 to perform the operations necessary with respect to the database 16 and to return one or more response messages 32 to the user.

Figure 5:
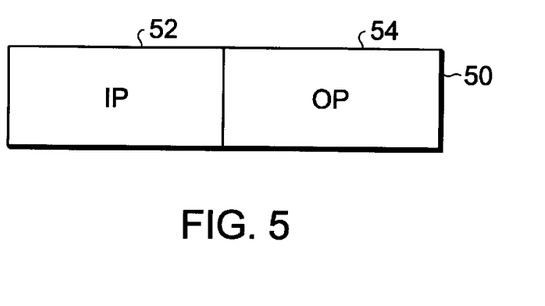
FIG. 5 is a schematic representation of an LDAP message format.

FIG. 5 contains schematic representation of an LDAP message format (LDAP message) 50 which provides an envelope containing common fields required in all protocol exchanges. The LDAP message provides a sequence with a message identifier (message ID) 52 followed by a protocol operator (protocol OP) 54. The message ID has a unique value compared to that of all other outstanding requests in an LDAP session. The message ID is echoed in all responses corresponding to a request in which the message ID was initially used.

The protocol operation specified by an LDAP message can conventionally be selected from the following types:

bindRequest—initiates a protocol session between a client and a server and sets out the parameters for the session;

bindResponse—returns an indication of the status of the client's request for initiation of a session;

unbindRequest—terminates a session and has no response defined;

searchRequest—enables a client to initiate a search and defines: the base object in the directory with respect to which the search is to be performed; the scope of the search to be performed; an indication of how aliases are to be handled; a maximum search result size to be returned; a time limit for the search; indication of which attributes are to be returned and whether attribute types and/or values are to be returned; and a filter defining match characteristics;

searchResponse—returns the response to a search request, wherein a sequence of responses will typically be necessary in order to return the full response to the request from the client;

modifyRequest—enables a client to request modification of an object in the directory;

modifyResponse—returns the result of the modification request;

addRequest—enables a client to request addition of an object to the directory;

addResponse—returns the result of the addition request;

delRequest—enables a client to request deletion of an object to the directory;

delResponse—returns the result of the deletion request;

modifyRDNRequest—enables a client to request modification of the last component (Relative Distinguished Name) of the name of an entry in the directory;

modifyRDNResponse—returns the result of the RDN modification request;

compareDNRequest—enables a client to compare an attribute value with an entry in the directory;

compareDNResponse—returns the result of the comparison request;

abandonRequest—enables abandonment of a request.

Thus the directory controller 44 is arranged to perform the operations necessary to be able to return the appropriate responses to the different requests identified above. It will be noted that each of the request—response pairings noted above effectively provide a solicitation for a response and the solicited response itself.

There is no provision for unsolicited communication from the server to the client, that is from the directory service 10 to the DUA 28. Conventionally, unsolicited LDAP messages have been sent between a directory service master 14 and a directory service slave 22 to ensure that the directory databases are consistent in the directory service master 14 and slaves 22, but not with the clients. This has employed the socalled replication process.

The directory service, in the context of the present invention, however, sends unsolicited messages related to selected variables in the directory database to DUAs.

This can be achieved using conventional replication messages and arranging for suitable filters (e.g., filter 46) to identify that, when a change is made to a particular variable, a replication message should be sent to a DUA in accordance with an embodiment of the invention, as will be described in more detail below.

The replication filters can be established manually by an operator at the directory service master, but could alternatively be generated in response to appropriate messages from a DUA.

For example, a DUA can issue an LDAP addRequest to the directory server, which LDAP addRequest contains the replication filter and the address of the DUA. This addRequest can thereby be used to enable a DUA to establish an appropriate replication filter at the directory server. Alternatively, an LDAP modifyRequest or another type of message supported by the employed version of LDAP could be used to modify or otherwise to configure a replication filter at the directory server.

However, it is not necessary for the replication filter to be established by the DUA. As indicated above, a replication filter could be established in a conventional manner by an operator at the directory service master. Also, a replication filters could be implemented in any appropriate form, by using look up tables, linked list structures, etc.

The directory controller 44 provides a replication mechanism 45 which provides replication messages for enabling a slave directory database(s) 22 to be updated to mirror changes to the master directory database 16. In the context of an embodiment of the invention, it also arranges for replication messages to be issued to DUAs 28 (if any) which are to be informed of changes to the object variables in the database 16 in which changes are made. This is achieved in the present embodiment in that, when a change is made to one or more object variables in the database, the directory controller replication mechanism accesses a filter 46 for the variable(s) to identify the DUA(s) 28 which are to receive replication messages identifying changes made to the object variable(s) concerned. The issue of replication messages will typically, but need not, be within a client-server session. The client DUAs 28 are arranged to respond to replication messages as required for the applications concerned at the appliance 26.

Figure 6:
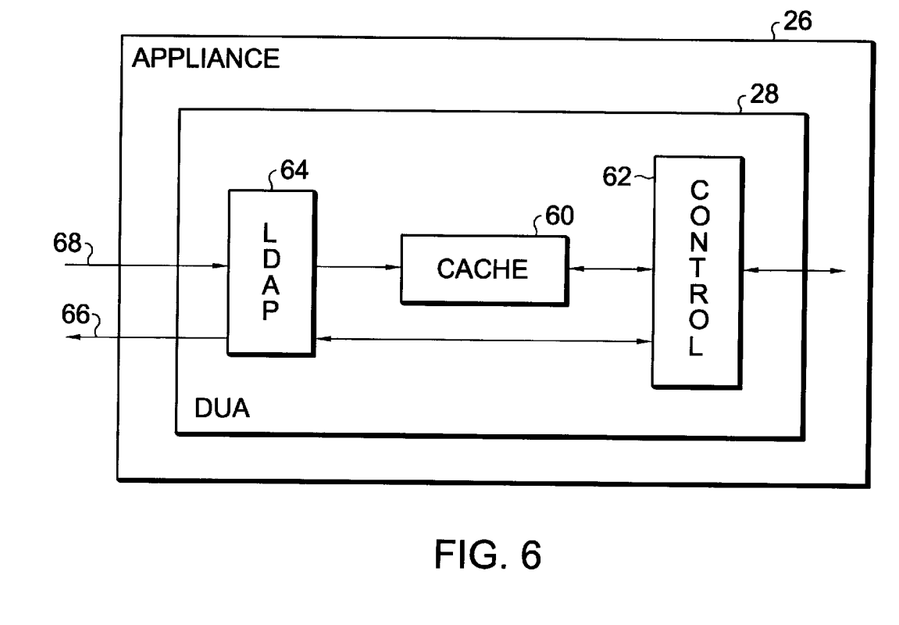
FIG. 6 is a schematic block diagram of a DUA according to an embodiment of the invention.

FIG. 6 is a schematic overview of an appliance 26 including a directory user agent 28. The appliance can be a network element such as a computer or other information processing device including conventional hardware (e.g., processor, memory) and software (e.g. operating system) components, or could be an application on such a network element.

The DUA includes an LDAP interface 64 for communicating with the directory service by means of LDAP messages over a connection, which could be fixed or part of a network. A cache 60 forms local storage for variables and a controller 62 is responsive to communications with the appliance and for controlling the DUA.

Figure 7:
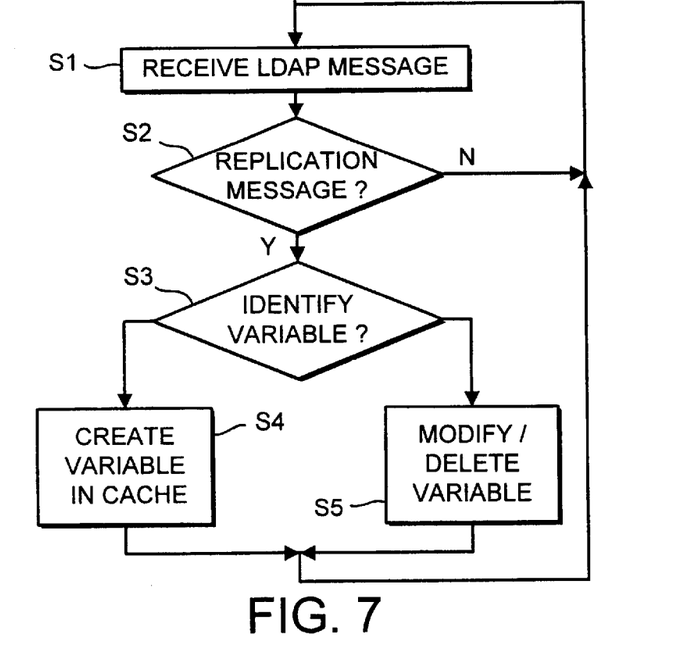
FIG. 7 is a flow diagram illustrating functions performed in the DUA of FIG. 6.

FIG. 7 is a schematic flow diagram illustrating the processing of replication messages from the directory service.

In step S1, a message is received at 68 by the LDAP interface 64.

In step S2, the LDAP interface or the DUA controller 62 or both determine whether the message is a replication message.

In step S3, it is identified whether the replication message relates to an existing variable held in the cache 60.

In step S5, if the variable already exists, it is updated or cancelled to mirror the change at the directory service according to the replication message.

In step S4, if the variable did not already exist in the cache, a local record for that variable is created in the cache.

Figure 8:
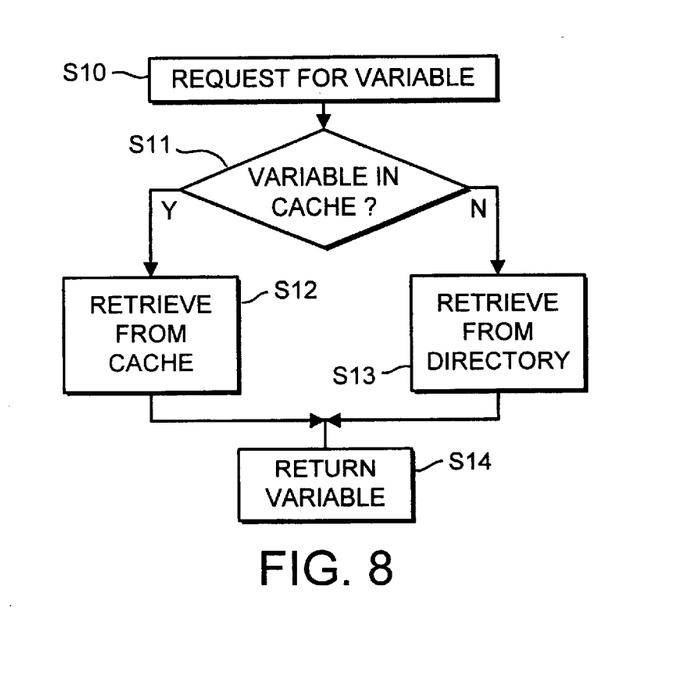
FIG. 8 is a flow diagram illustrating further functions of the DUA of FIG. 6.

FIG. 8 is a flow diagram illustrating the use of the local cache by the DUA controller 62.

In step S10, a request for a variable is received from the appliance.

In step S11, the controller looks to see if the variable is in the cache.

In step S12, if the variable is in the cache, then in step S14 the variable is returned to the appliance as the DUA controller 62 knows that this is the current value thanks to the replication mechanism.

In step S13, if the variable is not in the cache, the controller issues a request at 66 to the directory service for the current value of the variable. In step S14 this value, when received from the directory service, is then returned to the appliance and the variable can be stored in the cache.

Thus, in a DUA according to an embodiment of the invention, in contradistinction to DUAs of the prior art, a replication message (e.g., in the present embodiment a modifyRDNRequest issued by the directory master) can be received and processed by a DUA in order to maintain a local cache of variables of interest. In principle, a complete copy of the directory could be maintained in the cache. However, this would be inefficient, and it is advantageous that only selected variables are maintained locally.

The network element with the DUA functions can be implemented as a software mechanism on conventional computing hardware (e.g. a computer including conventional components such as memory, processor, display, user input devices, etc.) at the appliance. Thus the DUA controller 62 can be implemented by code stored in an execution memory and executed on a processor, with the cache being stored in memory. Memory at the appliance can thus form a carrier medium for the cache and DUA controller and component parts thereof. Indeed, an appliance can itself be a program product operable on conventional computing hardware at a client station, with the appliance stored in memory at a client station as a carrier medium. This can also be supplied as a computer program product on a disc, over a network communication line or any other carrier medium. Alternatively, they can be implemented at least in part by special purpose hardware, for example one or more ASICs.

Although exchanges between the directory service master 14 and a DUA client 28 have been described above, the same exchanges can be performed between a directory service slave 22 and a DUA client 28.

Figure 9A:
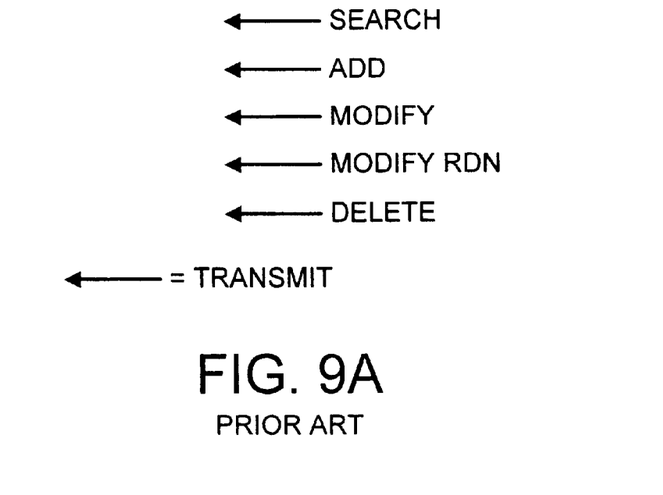
FIG. 9 illustrates the different message type available with the prior art and with an embodiment of the invention.

FIG. 9 illustrates the differences between the types of request messages which can be transmitted from a directory master to a DUA client, and vice versa, according to the prior art and according to an embodiment of the invention.

Figure 9B:
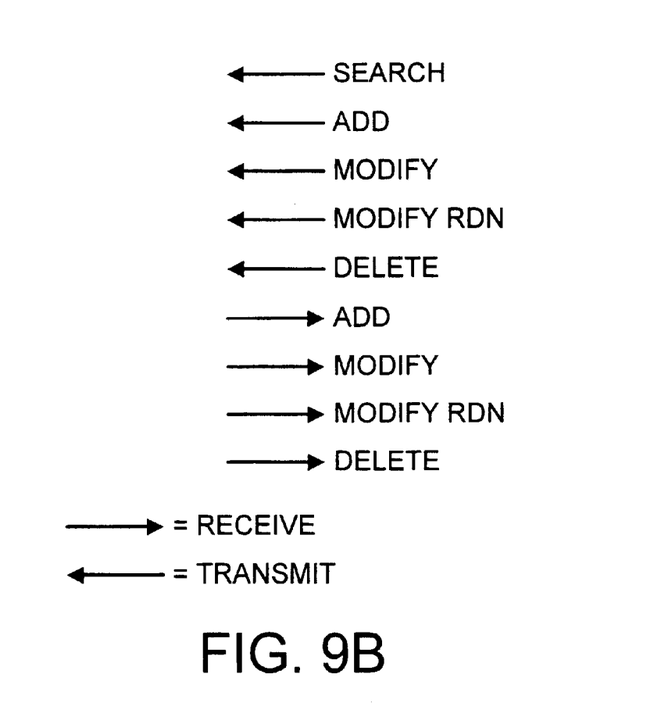

Thus it will be seen from FIG. 9B that, according to the present invention, a DUA can receive an unsolicited modifyRDNrequest (replication) message (as well as add, modify and delete messages) from a directory service. It can also send search, add, modify, modifyRDN and delete messages. By comparison, it can be seen from FIG. 9A that a prior art DUA can only send search, add, modify, modifyRDN and delete messages. It cannot receive add, modify, modifyRDN and delete messages. By further comparison, a conventional directory slave can only receive add, modify, modifyRDN and delete messages, it cannot send search, add, modify, modifyRDN and delete messages.

It will be appreciated that although particular embodiments of the invention have been described, many modificationsladditions and/or substitutions may be made within the spirit and scope of the present invention as defined in the appended claims. With reference to those claims, it is to be noted that combinations of features of the dependent claims other than those explicitly enumerated. in the claims may be made with features of other dependent claims and/or independent claims, as appropriate, within the spirit and scope of the present invention.

What is claimed is:

1. A computer implemented method of updating a local record of a variable in an appliance comprising a directory user agent forming a client of a directory service on a telecommunications network, said directory service being configured to store and distribute information related to managing said telecommunications network including data on resources available on said telecommunications network and said variable relating to a portion of the network information and being maintained in a directory of said directory service, the method comprising:

at the directory service, establishing a replication request for the variable with respect to said appliance;

operating the directory service to identify a change in the variable at the directory service;

responding to the change to said variable by issuing said replication message to said directory user agent;

receiving with said directory user agent a replication message from said directory service in respect of a change to said variable; and responding to said replication message to update said local record of said variable in the appliance.

2. The method of claim 1, wherein establishing comprises establishing a filter for said variable manually by an operator, wherein the filter directs the replication message to said directory user agent of said appliance.

3. The method of claim 1, wherein said establishing comprises establishing a filter automatically in response to a request from said appliance, wherein the filter directs the replication message to the directory user agent of said appliance.

4. The method according to claim 1, wherein said replication message is an LDAP replication message.

5. The method of claim 4, wherein said computer network directory is an object-based directory.

6. The method of claim 1, wherein said computer network directory is an Internet directory service X.500 directory.

7. The method of claim 1, wherein a cache is provided in local storage, said appliance being responsive to a request for said variable initially to access said cache, and in the absence of said variable in said cache, remotely to access said directory service for said variable.

8. The method of claim 1, wherein said appliance is an information processing device.

9. The method of claim 1, wherein said appliance is an application operable on the appliance.

10. A network element for forming a client of a directory service on a telecommunications network, said network element comprising:

local storage for variables; and a directory user agent including a response mechanism configured to be operable to receive an unsolicited replication message from said directory service in respect of a change to a variable at said directory service and to respond to said replication message to update a local record of said variable in said local storage of the network element for forming the client and a request and response mechanism configured to transmit request messages to said directory service specifying operations on said variable and to receive in response to said transmitted request messages solicited messages from said directory service.

11. The network element of claim 10, wherein said replication message is an LDAP replication message.

12. The network element of claim 10, wherein said local storage provides a cache, said network element being configured to be responsive to a request for a variable initially to access said cache, and in the absence of said variable in said cache, remotely to access said directory service for said variable.

13. The network element of claim 10, wherein said network element is an appliance and the unsolicited replication message is a modify RDN request, an add message, a modify message, or a delete message for said variable in said local storage and the solicited message is a search for said variable message, an add said variable message, a modify said variable message, a modify RDN request, or a delete said variable message.

14. The network element of claim 13, wherein said appliance is an information processing device.

15. The network element of claim 14, wherein said appliance is an application operable on the network element.

16. A computer program product on a data carrier medium for a network element of a computer network forming a client of a directory service on said computer network, said computer program product comprising:

a response mechanism configured to be operable to receive unsolicited replication message from said directory service of said computer network in respect of a change to a variable pre-established as a monitored network variable with a filter at said directory service;

an update mechanism configured to be responsive to said replication message to update a local record of said variable at said network element forming a client; and a request and response mechanism configured to be operable to transmit request messages to said directory service specifying operations on said variable and to receive in response to said transmitted request messages solicited messages from said directory service related to said variable.

* * * * *